June 12, 1923.

H. H. SCHAEFER

GATE FASTENER

Filed Jan. 14, 1922

Inventor
H.H. Schaefer
By Watson E. Coleman
Attorney

June 12, 1923.
H. H. SCHAEFER
GATE FASTENER
Filed Jan. 14, 1922
1,458,664
2 Sheets-Sheet 2
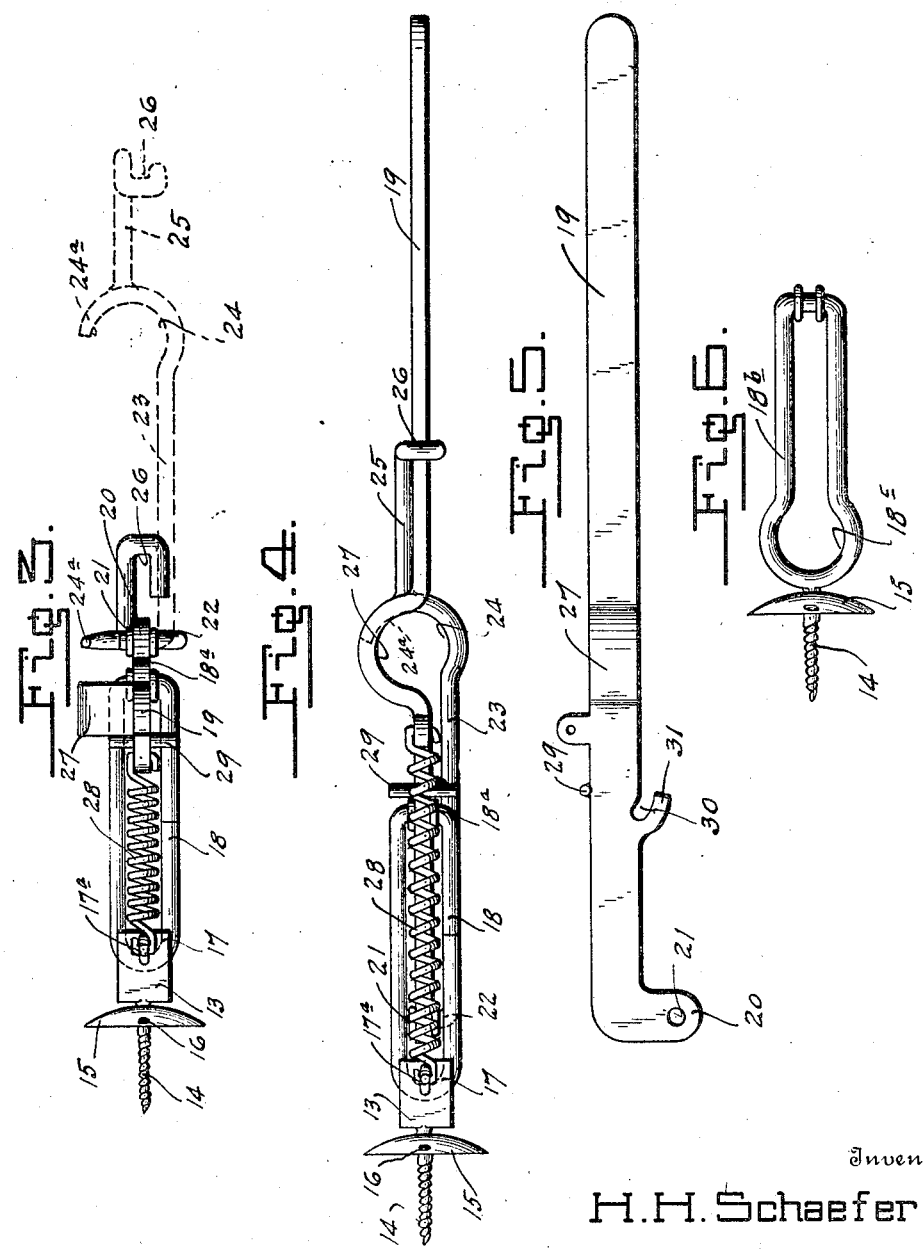
Inventor
H. H. Schaefer
By Watson E. Coleman
Attorney Patented June 12, 1923.

1,458,664

UNITED STATES PATENT OFFICE.

HENRY H. SCHAEFER, OF WELDONA, COLORADO.

GATE FASTENER.

Application filed January 14, 1922. Serial No. 529,251.

*To all whom it may concern:*

Be it known that I, HENRY H. SCHAEFER, a citizen of the United States, residing at Weldona, in the county of Morgan and State of Colorado, have invented certain new and useful Improvements in Gate Fasteners, of which the following is a specification, reference being had to the accompanying drawings.

This invention relates to gate fasteners and more particularly to wire gate fasteners or tighteners.

The principal object of the invention is to provide a simple and efficient device of this character which hangs down out of the way when disconnected from the gate, so that it is not subject to breakage when stock or wagons are passing through the gate.

A further object of the invention is to improve the structure shown in my copending application, Serial No. 487,040, filed July 23, 1921, in which a somewhat similar structure is disclosed, but which is possessed of certain disadvantages which it is the object of this invention to overcome.

A further object of the invention is to provide in gate fasteners of this type in which shiftable levers are employed for tightening the gate through the medium of a movable link or hook connection, means for mounting the operating lever in a normally vertical position when the tightener is disconnected so that it may be readily engaged with the hand and will occupy a minimum space.

A further object of the invention is to provide a support for the lever and link tightener device, whereby the same may swing from side to side in the event of being engaged by stock or wagons passing through a gate.

A still further object of the invention is to provide a structure of this character wherein the link combines with the hook and permits a positive lock about the gate stick, preventing accidental opening of the gate as by engagement of the locking mechanism by the horns of cattle rubbing against the gate.

Other objects and advantages of the invention will appear throughout the following description.

In the accompanying drawings, wherein for the purpose of illustration is shown a preferable form of my invention, and wherein like reference characters designate like parts throughout:—

Figure 3 is an enlarged plan view of the fastener in the open position;

Figure 4 is a similar view of the fastener in the closed position;

Figure 5 is a side elevation of the lever showing the manner of constructing the same; and Figure 6 is a plan view of a modified form of fastener and link construction.

Figure 1:
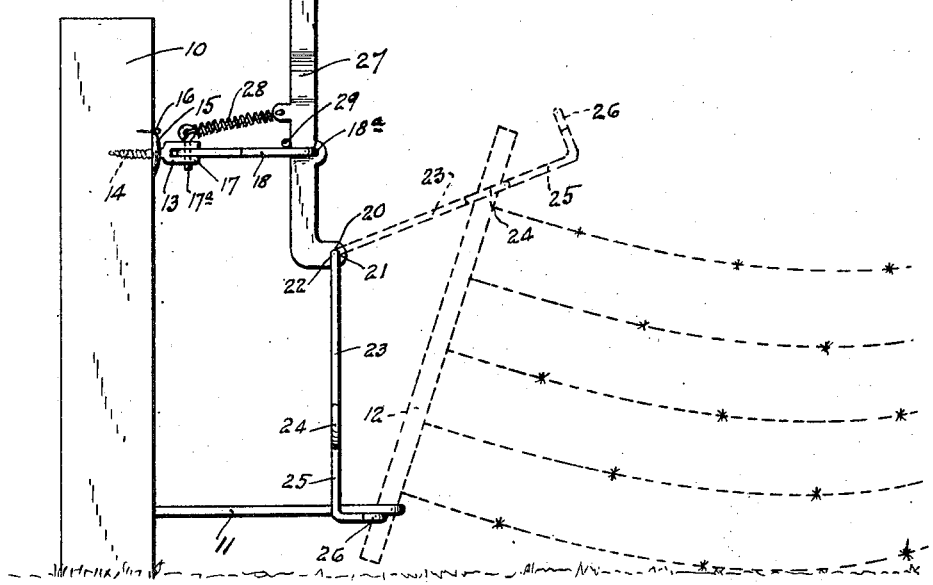
Figure 1 is a side elevation showing a gate fastener constructed in accordance with my invention applied to a gate and in the open position.
Figure 2:
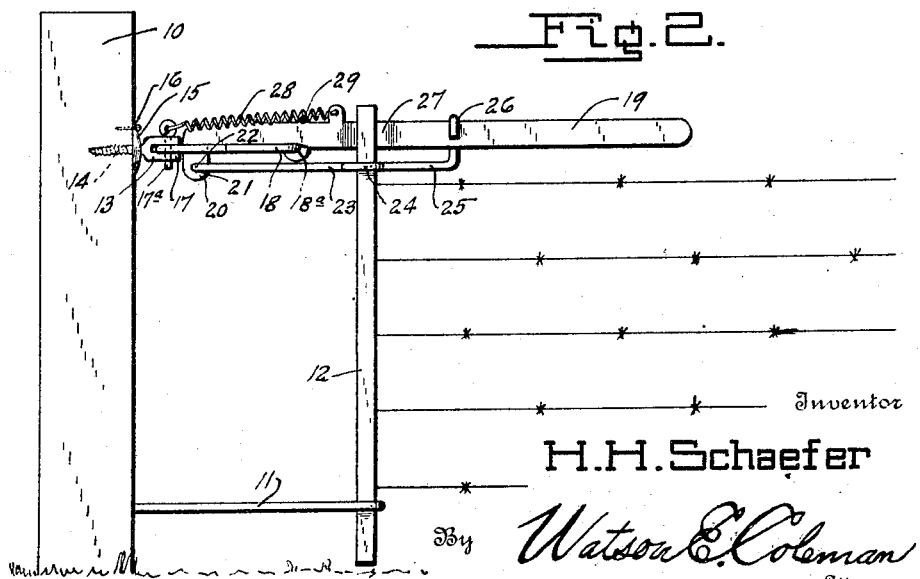
Figure 2 is a similar view showing the gate in the closed position.

Referring now more particularly to the drawings, the numeral 10 designates a gate post to which is attached a gate stick loop 11 adapted for the reception of the lower end of a gate stick 12 forming one end of a wire gate G. Since the construction of the gate G has been changed no way from the ordinary construction, only those portions thereof which are necessary to the illustration of my invention will be hereinafter included. It will be understood, however, that the opposite side of the gate is secured to a post in the usual manner.

Threaded into the post 10 in a desired level is an adjusting member 13 shown in the present instance as embodying a lag screw 14 engaging in the post and having a collar 15 provided with an opening through which a securing element 16 may be driven into the post to prevent rotation of the adjusting member. The adjusting member likewise embodies a head having ears 17 formed thereon which are spaced and horizontally directed and intermediate which extends a closed link 18 held in position intermediate the ears by a pin 17ª extending through the link and ears. The construction just recited permits the link 18 to swing in a horizontal plane only.

To the free end of the link 18, a latch lever 19 is pivotally connected adjacent one end as at 18ª. This latch lever is provided at said end with an offset 20 having an aperture 21 therein which receives an offset end 22 of a gate hook 23. This gate hook is shaped at its free end to form a hook 24, the bill of the hook being bent to one side of the plane of the body of the hook, the bending being such that when the hook is horizontally disposed as it is when it is engaged with the gate stick and the gate closed, the bill 24ª will extend upwardly. The hook is provided with an extension 25 having at its end an angularly disposed hook 26 opening at the side of the hook 24 opposite from the hook opening.

The latch lever 19 is provided with an offset bend 27 opposed to the bend of the hook 24 and is of sufficient length to permit its engagement with the hook 26 of the extension 25 and as much longer as may be desired. It will be seen that the offset 27 of the lever 19 prevents the necessity of springing the lever around the gate stick and at the same time combines with the hook 24 to form a substantially circular band receiving the gate stick, the upbent end 24ª of the hook 24 lying behind the bend or offset 27 of the lever 19 and accidental engagement of the hook end is accordingly prevented.

Attention is directed to the fact that in engaging the latch lever 19 with the hook 26 it is necessary that the middle of the latch lever 19 cross the middle of the hook or of its extension, and accordingly if the lever 19 be forced down as by engagement with the body of an animal it will not be shifted clear of the hook 26. It is necessary, to accomplish this object, that the latch lever be moved downwardly and subsequently toward the open side of the hook.

In order that the latch lever may be kept fully engaged with the hook 26 and to accomplish further objects hereinafter to appear, I secure to the latch lever at a point intermediate the pivot point 18ª and the end thereof engaging the hook 26, one end of a spring 28, the opposite end of which is connected to the adjusting member 13. This spring tends to force the handle or latch lever into the position shown in Figure 1, the movement of the lever after arriving in said position being limited by a lug 29 coming in engagement with the link 18. The tension supplied by this spring will be sufficient to keep the lever 19 fully engaged with the hook and at the same time will assist in moving the lever to the position shown in this figure. Furthermore, the handle is maintained in a vertical position when the gate is open so that it may be readily engaged.

While I do not wish to be understood as limiting myself to this specific structure, I prefer to form the latch lever 19 with a notch 30 at one side of which a teat 31 is formed for ease in assembling the latch lever upon the link 18. In such assembling the lever has the notch thereof engaged with the link 18 and the teat 31 is bent over to maintain the lever in position upon the link. The usual removable pin construction may be employed with the link if so desired but as the same is old and well known it is not herein illustrated.

In Figure 6 I have illustrated a slightly modified form of adjusting member and link. In this figure the adjusting member and link are shown as formed integrally, the link 18ᵇ being welded or cast in one piece with the collar 15 of the securing member 14. It will, of course, be understood that the links 18 and 18ᵇ are provided with enlarged portions 18ᶜ permitting ready passage of the bent end of the latch lever and the end of the gate hook 23. While the structure shown in Figure 6 does not permit of horizontal oscillation of the hook and latch lever, it is a construction which may be employed to advantage in many instances.

From the foregoing it is believed to be obvious that I have constructed a gate tightener or fastener which is particularly well adapted for the use for which it is intended and that the gate stick is firmly locked in position when the device is closed and may be readily released when desired and in that when the device is open it is properly positioned for engagement and may be readily handled and is not subject to breakage since it may be oscillated horizontally to swing out of the path of anything which may engage therewith. It will furthermore be obvious that many mechanical details of the structure thereof may be altered without in any manner departing from the spirit of the invention herein disclosed and I accordingly do not limit myself to the specific structure thereof except as hereinafter claimed.

What I claim is:

1. In a wire gate fastener or tightener, the combination with a support, of a securing member attached to the support, a lever pivotally connected therewith, a hook pivotally connected with the lever and adapted to engage the gate stick, said hook and lever combining to encircle the gate stick when the hook is engaged with the gate stick and the lever swung to the fastening position and means carried by the hook for securing the lever in fastening position.

2. In a wire gate fastener or tightener, the combination with a support, of a link pivoted to the support to swing in a horizontal plane and held against vertical movement, a lever pivoted to the link to swing in a vertical plane, and a link pivoted to the lever and adapted to engage the gate stick.

3. In a wire gate fastener or tightener, the combination with a support, of a securing member attached to the support, a lever, a link connection between the lever and the securing member which is pivoted to both, yieldable means connecting the securing member and the lever for normally maintaining the lever in vertical position, and a link pivoted to the lever and adapted to engage the gate stick of the gate.

4. In a wire gate fastener, the combination with a support, of a securing member attached to the support, means for preventing rotation of the securing member, a link pivoted to the securing member to swing in a horizontal plane, a lever pivoted intermediate its ends to the link to swing in a vertical plane, means connecting the supporting member and the lever for normally maintaining the lever in a vertical position, and a link pivoted to the lever and adapted to engage a portion of the gate.

5. In a wire gate fastener, the combination with a support, of a securing member attached to the support, a lever, a link connection between the lever and the securing member which is pivoted to both, a hook pivoted to the lever and adapted to engage a portion of the gate, an offset formed in the lever adapted to be disposed at the opposite side of the engaged portion of the gate from the hook when the device is in the closed position, and means carried by the hook for maintaining the lever in the closed position.

6. In a wire gate fastener, the combination with a supporting post, of a securing member attached to the post and provided with an integral collar having an opening therethrough, a securing member extending through the opening of the collar and engaging the support, horizontally disposed vertically spaced ears carried by the securing member, a link pivoted intermediate said ears, a lever pivoted to the free end of the link and a gate stick engaging member pivoted to the lever.

7. In a wire gate fastener, the combination with a supporting post, of a supporting member secured thereto, a link pivoted to the supporting member to swing in a vertical plane, a lever pivoted to said link intermediate its ends, a link arranged for connection between the gate stick and one end of the lever and having an opening in one side thereof, a hook on said link adapted to receive the opposite end of the lever, and an offset in the lever arranged to receive the gate stick at the side thereof disposed toward the opening of said link.

8. In a wire gate fastener, the combination with a supporting post, of a supporting member secured thereto, a link pivoted to the supporting member to swing in a vertical plane, a lever pivoted to said link intermediate its ends, a link arranged for connection between the gate stick and one end of the lever and having an opening in one side thereof, a hook on said link adapted to receive the opposite end of the lever, and an offset in the lever arranged to receive the gate stick at the side thereof disposed toward the opening of said link, the hook carried by said link opening away from the side of the link provided with the opening.

9. In a wire gate fastener or tightener, the combination with a support, of a link pivoted to the support to swing in a horizontal plane and held against vertical movement, a lever pivoted to the link at the free end thereof to swing in a vertical plane, means connecting the lever and support yieldably holding the lever in vertical position, and a link pivoted to the lever and adapted to engage the gate stick.

In testimony whereof I hereunto affix my signature.

HENRY H. SCHAEFER.